United States Patent [19]

Murvall

[11] 3,971,530
[45] July 27, 1976

[54] FISHING REEL

[75] Inventor: Ake Eugen Murvall, Svangsta, Sweden

[73] Assignee: ABU Aktiebolag, Svangsta, Sweden

[22] Filed: May 6, 1974

[21] Appl. No.: 467,588

[30] Foreign Application Priority Data

May 11, 1973 Sweden.............................. 7306661

[52] U.S. Cl. ............................................. 242/217
[51] Int. Cl.² ........................................ A01K 89/02
[58] Field of Search ........... 242/217, 219, 218, 212, 242/213, 214; 192/93 A, 95, 97, 14; 64/30 R, 30 E

[56] References Cited
UNITED STATES PATENTS

| | | | |
|---|---|---|---|
| 2,198,257 | 4/1940 | McMahon....................... | 242/217 X |
| 2,993,660 | 7/1961 | Parks ........................... | 242/84.51 R |
| 3,029,040 | 4/1962 | Wood ............................ | 242/219 X |
| 3,223,349 | 12/1965 | Holahan........................ | 242/217 |
| 3,326,492 | 6/1967 | Murvall........................... | 242/218 X |

*Primary Examiner*—Billy S. Taylor
*Attorney, Agent, or Firm*—Karl W. Flocks

[57] ABSTRACT

This invention relates to a combined sliding clutch and slide signal mechanism in a transmission between a rotatable spool and a crank of a fishing reel, said sliding clutch and signal mechanism including a gear wheel connected so as to drive the spool, a disc fixed on a shaft driven by the crank and placed in spaced relationship to one side of said gear wheel, and a friction ring placed between annular surfaces of the two members constituted by said disc and said gear wheel, one of said members being adapted to be axially urged against said friction ring by controllable force exerted on the other member by adjusting means on the fishing reel to effect slidable coupling between said members via said friction ring, and a slide signal device constituted by cooperating slide signal producing means mounted in facing relationship on said members and adapted to produce slide signals when relative rotation occurs between said members and thus between said signal producing means, wherein said gear wheel, signal producing means and friction ring are arranged such that the friction ring is seated radially inwardly of the teeth of the gear wheel and radially outwardly of the circular path of said slide signal producing means on said members, thereby eliminating any tendency of said friction ring to interfere with the signal producing means.

5 Claims, 3 Drawing Figures

FISHING REEL

The present invention relates to a fishing reel including a sliding clutch mechanism and a slide signal device arranged in a transmission between the crank and the spool, said transmission including a gear wheel rotatably mounted on a shaft driven by the crank, said gear wheel being adapted to be connected with the shaft by means of said sliding clutch mechanism, said sliding clutch comprising an element adapted for rotary motion with the shaft, either of the two members constituted by said element and said gear wheel being axially movable towards the other for mutual frictional engagement by means of a force which is controllable by an adjusting means, via a friction ring placed between said members, said members also constituting said slide signal device in that each of said members includes a means for signal producing engagement with a cooperating means of the other member when sliding occurs.

Conventional fishing reels often include, between the crank and the spool, an adjustable sliding clutch mechanism which admits sliding in the transmission between the crank and spool when a certain pull in the line is exceeded. This will allow the angler, at a reduced risk of the line being overloaded, to hold the crank or to rotate the crank for reeling in the line when a fish has taken the bait and offers resistance. Conventional sliding clutch mechanisms are generally readily adjustable for increasing or decreasing the pull in the line required to bring about sliding and are provided with a click signal mechanism which enters into operation on sliding and informs the angler that the pull in the line exceeds the retaining or reeling-in force, which usually is due to the resistance from a fish or, accidentally, to the hook being caught on the bottom.

In a prior art construction the transmission has between the crank and the spool a gear including a gear wheel which is rotatably mounted on the shaft of the crank and connected with the shaft by means of a sliding clutch mechanism of the type mentioned above. Connected with the gear wheel and the shaft are two elements adapted for movable interengagement, comprising a click signal spring mounted in a circular recess in one side of the gear wheel and a signal tooth wheel which is non-rotatably mounted on the shaft but axially movable thereon. The diameter of the recess in said one side of the gear wheel is substantially smaller than that of the root circle of the gear wheel, and the outside diameter of the signal tooth wheel is smaller than that of the recess to allow introduction of this wheel thereinto. The gear wheel and the signal tooth wheel form at least part of the sliding clutch mechanism since the side of the signal tooth wheel facing the gear wheel engages the bottom surface in the recess of the gear wheel via a friction ring.

The present invention has for its object to overcome two disadvantages of said prior art construction. One disadvantage is that the friction ring must have a relatively small diameter to find room inwardly of the teeth of the tooth wheel and inwardly of the pawl in the recess in the gear wheel in order not to be damaged by the teeth or to disturb the function of the click signal mechanism and the other disadvantage is that the compression force on the friction ring, due to the wedging force between the gear wheel and the signal tooth wheel, has a tendency to expand the friction ring radially outwardly, and to this contributes the torsional force on the friction ring when sliding occurs between the gear wheel and the signal tooth wheel. It should be borne in mind that the friction ring to permit smooth and uniform sliding consists of leather or other relatively soft material.

These inconveniences have been overcome with the fishing reel construction of this invention, wherein the friction ring between the gear wheel and said element is placed radially outwardly of the circular path of movement of the slide signal producing mechanism of said element between annular frictional faces on the gear wheel and said element, which are located outwardly of said path.

Further features and advantages of this invention will appear from the following description.

The fishing reel of this invention permits using a friction ring which has a substantially larger diameter than is the case with prior art constructions of comparable type and it can be supported at its outer circumference against the circumferential surface of the recess in the gear wheel. A substantially larger diameter gives a substantially increased braking power and this is of great value.

The invention will be described in more detail hereinafter with reference to the accompanying drawing, in which.

Figure 1:
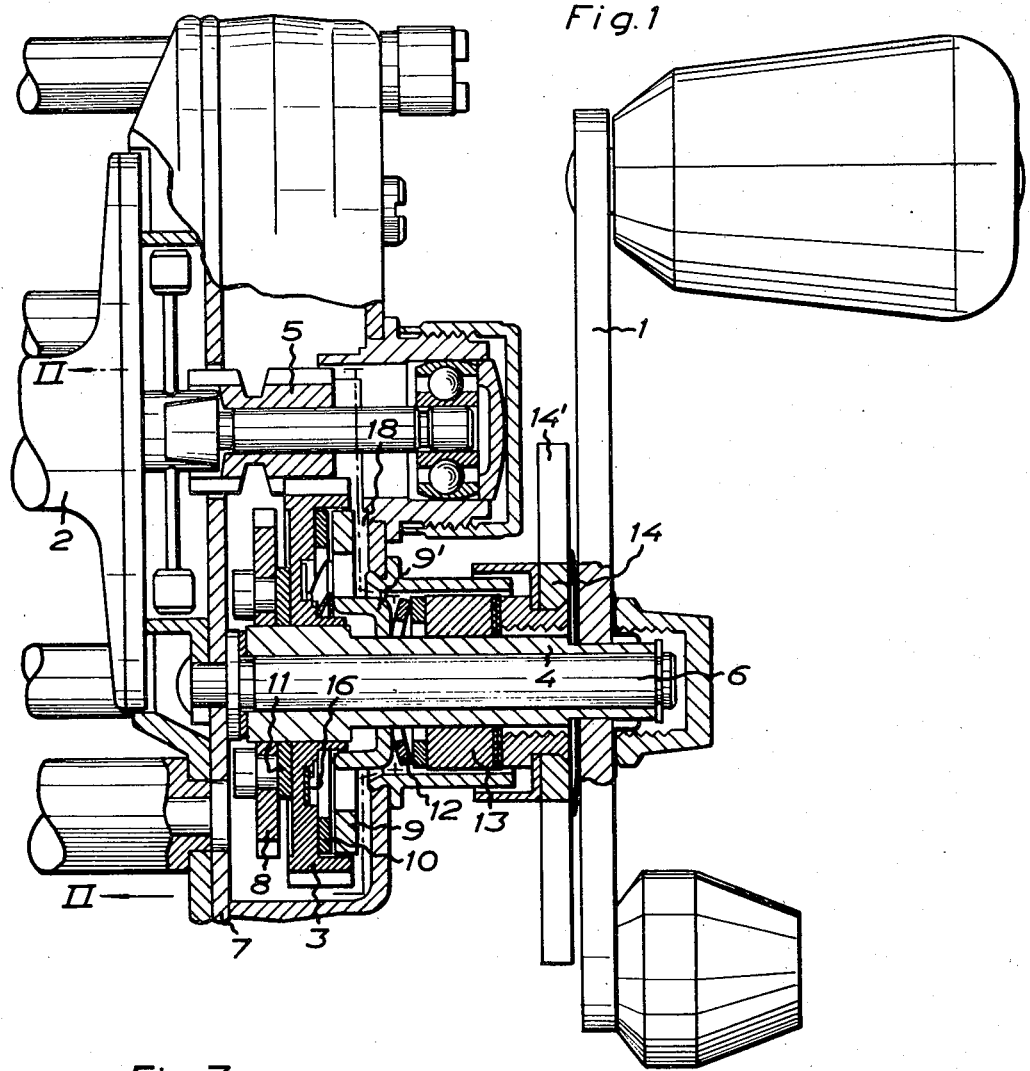
FIG. 1 is a sectional view of the gear housing of a fishing reel according to the invention.

In the fishing reel shown in FIG. 1, the crank 1 is connected with the line spool 2 via a gear including a gear wheel 3 which is freely rotatably mounted on the shaft 4 of the crank 1 and engages a pinion 5 for driving the spool. The shaft 4 is hollow and mounted on a journal 6 one end of which is fixed to a wall 7 of the gear housing. The gear wheel 3 is mounted so as to be freely rotatable and axially movable on a cylindrical end portion of the shaft 4 between, on one side, an element 8 fixed to the corresponding end of the shaft, said element being in this case an anti-backlash wheel, and on the other side, a coupling and signal wheel 9 which is axially movably mounted on the shaft but non-rotatable relative thereto. Provided between this wheel 9 and the gear wheel 3 is a friction ring 10 and between the gear wheel 3 and the anti-backlash wheel 8 is another friction ring 11. By urging the wheel 9, which is axially movable on the shaft 4, towards the gear wheel 3, the gear wheel can be connected, via the elements 8, 10 and 11, with the shaft by means of a frictional force which is dependent on an adjustable axially effective force, produced by a spring means, on the coupling and signal wheel 9. The spring means may comprise one or more spring washers 12 mounted on the shaft between a central part 9' of the wheel 9 projecting towards the crank, and a pressure and bearing ring 13 which is movably but axially non-rotatably mounted on the shaft 4 and can be pressed against the spring washer 12 by means of a nut 14 having projections 14' arranged in star fashion, on a threaded outer end portion of the shaft 4, said ring forming a bearing for the journal 6.

The axially movable but non-rotatable parts described above are mounted on a portion of the shaft 4 having one or more flat slide faces for co-operation with central apertures of complementary shape in said parts.

In analogy with a previously known construction, the gear wheel 3 includes in its side facing the crank a circular recess 15 having a diameter smaller than that of the root circle of the gear wheel 3, and the coupling and signal wheel 9 (corresponding to the tooth wheel used for the same purpose in said prior art construction) has a diameter smaller than that of the gear wheel recess so that it can at least partly be received in the recess 15 to reduce the axial length of the assembly formed of the gear wheel 3 and the coupling and signal wheel 9 with associated means.

Figure 3:
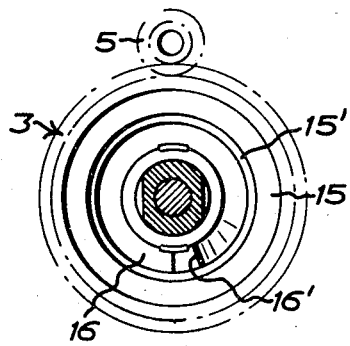
FIG. 3 is a view similar to that of FIG. 2 with the coupling and signal wheel removed.

According to the shown embodiment of the invention (see especially FIGS. 2 and 3) there is mounted on the bottom surface of an angular depression 15' of the recess 15 in the gear wheel 3 a bow-shaped leaf spring forming a click signal spring 16 having an outwardly directed resilient end 16' adapted to co-operate with a ring-shaped row of apertures 17 in the wheel 9 between the central projections 9' of the wheel and the peripheral outer edge of the wheel. As shown in the drawing, these apertures may be in the form of rectangular openings. By allowing the click signal spring 16 to co-operate with a ring-shaped row of apertures inwardly of the outer circumference of the wheel 9 instead of cooperating with the teeth of a tooth wheel, said spring can be placed in the recess portion 15' of the gear wheel 3 inwardly of the outer circumference of the coupling and signal wheel 9, and the friction ring 10 can be placed peripherally outwardly of the signal spring 16 for co-operation with the annular portion of the side surface of the wheel 9 between the circumference of the wheel 9 and the apertures 17. This gives two considerable advantages, viz. on one hand, that the tendency of the friction ring 10 to expand radially cannot disturb the functions of the signal means and the friction coupling and, on the other hand, that the friction ring 10 will have a maximum diameter with respect to the available space.

As the friction ring 10 when expanding radially outwardly (there is no tendency to radially inward expansion) will be supported against the outer boundary surface of the recess 15, the expansion will either stop or the outer edge of the ring 10 will become slightly conical, which leads to a certain increase of the friction at the outer edge of the ring but this will not impair the function of the friction coupling and will have no effect at all on the signal means. The increase of the diameter of the friction ring 10 allows a more exact control of the frictional engagement and a considerable increase of the braking power, which is most valuable when the fishing reel is used for heavier fishing.

These improvements have been realized entirely within the limits of the space used in said prior art construction having a tooth wheel for co-operation with a click signal spring and with the gear wheel 3.

It should be mentioned, however, that the advantages of the signal means being placed concentrically inwardly of the ring-shaped friction surfaces as described above, can also be used in many other prior art signal and friction coupling means of equivalent type. The signal and coupling wheel 9 may be adapted, for example, to co-operate with a side of the gear wheel which has no recess. In that case, however, the axial length of the arrangement will be larger for a certain axial length of the gear wheel 3. It is also possible to arrange the wheel 9 as a disk or flange which, for instance, is fixedly connected with the shaft 4, at the back of the gear wheel 3 of FIG. 1, in which case the gear wheel at its opposite side, i.e. its front, can be adapted to co-operate with a friction coupling element which is non-rotatably mounted but axially movable on the shaft and adjustable relative to the gear wheel 3 by means of the nut 4.

According to another modification the apertures 17 may be replaced by a ring or pins for co-operation with the pawl or the signal spring may be placed on the wheel 9 for co-operation with annularly arranged depressions or projections on the gear wheel 3.

Figure 2:
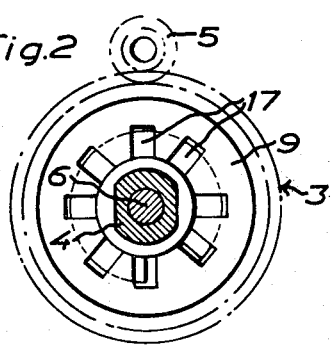
FIG. 2 is a fragmentary cross sectional view along line II—II of FIG. 1, showing the gear wheel and the coupling and signal wheel on the crank shaft and the pinion for driving the spool.

In the preferred embodiment of the coupling and signal wheel 9 as shown in FIG. 2, this wheel has relatively large rectangular through-holes 17 which not only are means for co-operation with the signal spring 15 but also serve as vents for cooling the sliding clutch. The fact that the holes are placed near the shaft leads to satisfactory cooling of the bearing surfaces of the gear wheel 3 and the shaft during sliding and also to cooling of the friction ring 11 which indeed consists of a resistant material that must maintain its thickness to serve as a spacer between the anti-backlash wheel 8 and the gear wheel 3, but may need protection against over-heating when the gear wheel 3 rotates during violent sliding which may occur, for instance, in salmon-fishing. As shown in FIG. 1, there is a certain free space 18 at the outer side of the wheel 9 to admit air circulation to the holes 17, and air circulating vents may also be provided in the hub projections 9' of the wheel.

These and other obvious modifications will thus fall within the scope of the invention.

What I claim and desire to secure by Letters Patent is:

1. A fishing reel comprising
   a handcrank;
   a rotatably driven part;
   a transmission connected between said handcrank and said rotatably driven part and including
   a shaft,
   an adjustable friction clutch mechanism mounted on said shaft including
      a gear wheel slidably connected by said adjustable friction clutch mechanism to said shaft,
      an element connected for rotary motion with said shaft and supported coaxially with said gear wheel,
      a friction ring located between and adjacent to said gear wheel and said element;
   friction clutch adjusting means exerting a controllable force to relatively axially move said element and said gear wheel toward each other for mutual frictional engagement through contact with said friction ring;
   a slide signal producing means arranged with said friction clutch adjusting means as an axially compact unit and supported by said element and said gear wheel, respectively, at sides thereof facing each other and in positions encompassed by said friction ring and radially inwardly of said friction ring for signal producing mutual engagement during relative rotational movement between said element and said gear wheel.

2. A fishing reel as claimed in claim 1, further characterized by a circular recess formed in one of two members constituted by said gear wheel and said element with said circular recess encircling said signal producing means supported by one of said members, said friction ring located within said circular recess, a flat annular friction surface in said circular recess on one of said members forming a backing service for said friction ring, and a circumferential shoulder defining said annular friction surface and forming an abutment for the circumferential edge of said friction ring.

3. A fishing reel as claimed in claim 1, in which said gear wheel in the side thereof facing said element has a circular recess for housing said friction ring and for receiving, at least partially, said element which is mounted non-rotatably but axially movably on said shaft and is axially adjustable by means of said adjusting means, wherein said signal producing means supported by said gear wheel is mounted on a radially inner portion of the bottom of said recess, said gear wheel having a flat annular friction surface in said recess encircling said signal producing means supported by said gear wheel and facing said element for backing said friction ring which has the form of a substantially flat-sided washer, said element having a corresponding flat, annular friction surface for contact with the opposite side of said friction ring, and said signal producing means supported by said gear wheel having the form of a spring detent and wherein said signal producing means supported by said element is a circular row of spaced engagement means located radially inwardly of said annular friction surface of said element and arranged for cooperative engagement with said spring detent radially inwardly of said annular surfaces in a space between said element and the bottom of said recess in said gear wheel.

4. Fishing reel as claimed in claim 3, wherein said engagement means supported by said element are recesses in the form of ventilation holes for cooling said clutch mechanism in the zone adjacent said shaft.

5. Fishing reel as claimed in claim 3, wherein said spring detent is mounted in a depression in the bottom of the recess radially inwardly of said annular surface of said gear wheel.

* * * * *